United States Patent [19]

Regehr et al.

[11] 4,157,250

[45] Jun. 5, 1979

[54] SCRUBBER APPARATUS FOR WASHING GASES AND HAVING A COARSE AND FINE DROPLET SEPARATOR

[75] Inventors: Ulrich Regehr, Süsterfeldstrasse 65, D-51 Aachen, Fed. Rep. of Germany; Siegfried Bulang, Kerkrade, Netherlands

[73] Assignee: Ulrich Regehr, Aachen, Fed. Rep. of Germany

[21] Appl. No.: 889,565

[22] Filed: Mar. 23, 1978

Related U.S. Application Data

[63] Continuation-in-part of Ser. No. 847,671, Nov. 1, 1977, abandoned, which is a continuation of Ser. No. 557,130, Mar. 10, 1975, abandoned, which is a continuation of Ser. No. 396,793, Sep. 13, 1973, abandoned.

[30] Foreign Application Priority Data

Sep. 22, 1972 [DE] Fed. Rep. of Germany ....... 2246474

[51] Int. Cl.² .................................. B01D 47/14
[52] U.S. Cl. .................... 55/233; 55/257 PV; 55/257 QV; 55/440; 55/443; 55/424
[58] Field of Search .......... 55/227, 233, 257 R, 55/257 PV, 257 QV, 258, 316, 321, 325–327, 440, 442, 443–446, 461, 464, 223, 424, 257 C; 261/111, DIG. 11

[56] References Cited

U.S. PATENT DOCUMENTS

| | | | |
|---|---|---|---|
| 1,493,579 | 5/1924 | Walter | 55/227 |
| 2,356,192 | 8/1944 | Yingling | 55/241 |
| 2,400,623 | 5/1946 | Baird et al. | 55/440 |
| 2,555,125 | 5/1951 | Gregory | 55/461 |
| 2,802,543 | 8/1957 | Clark | 55/242 |
| 3,338,035 | 8/1967 | Dinkelacker | 55/440 |
| 3,444,670 | 5/1969 | Hungate | 55/233 |
| 3,616,744 | 11/1971 | Jensen | 55/242 |
| 3,748,832 | 7/1973 | Furlong et al. | 55/443 |
| 4,028,077 | 6/1977 | Gleason | 55/257 QV |

FOREIGN PATENT DOCUMENTS

| | | | |
|---|---|---|---|
| 2056092 | 5/1972 | Fed. Rep. of Germany | 55/440 |
| 9938 of | 1908 | United Kingdom | 55/440 |
| 289118 | 1928 | United Kingdom | 261/111 |

OTHER PUBLICATIONS

Packed Tower Gas Scrubbers, 1967, Airetron Engineering Corporation, Bulletin 1067.

Primary Examiner—Frank W. Lutter
Assistant Examiner—David L. Lacey
Attorney, Agent, or Firm—Karl P. Ross

[57] ABSTRACT

A washing tower for the washing of gases containing particulates comprises a packed bed through which the gases pass upwardly and jets for spraying water into the gas as it rises within the tower. A preferably chevron-shaped coarse droplet separator is provided above the spray nozzles and the bed and consists of upper and lower arrays of oppositely inclined plates. Further spray nozzles are provided above the coarse separator and above these spray nozzles is disposed a fine-particle separator of the baffle type through which the gas is deflected in opposite directions and with passages of smaller width than those of the coarse particle separator. The gas emerges from the upper end of the tower.

10 Claims, 16 Drawing Figures

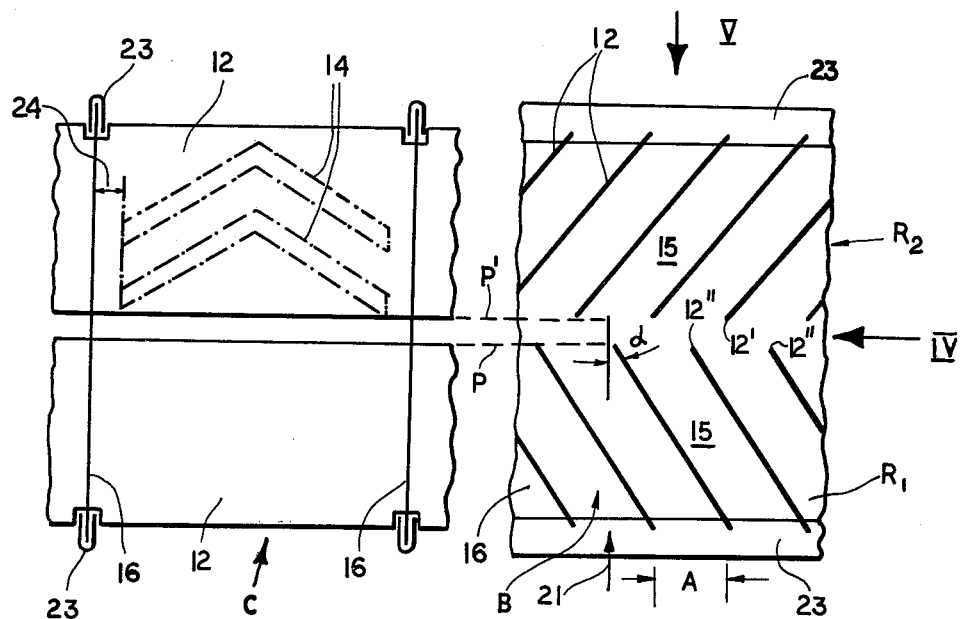
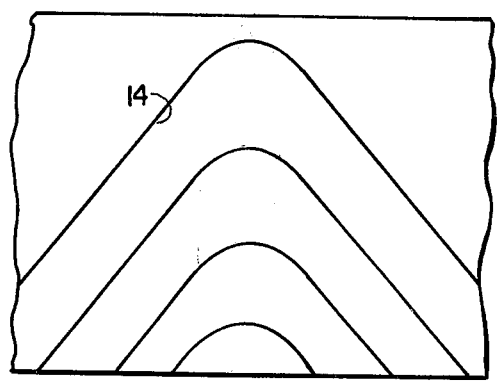
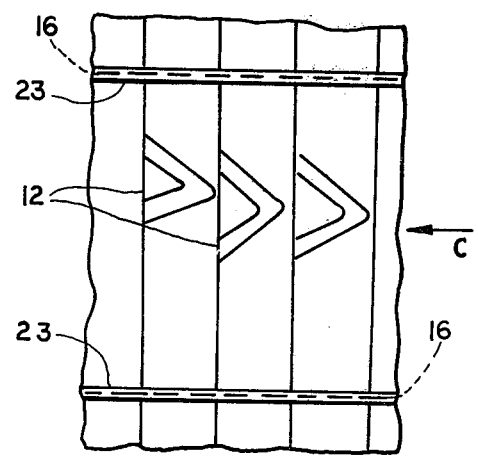
FIG. 4  FIG. 3
FIG. 4B
FIG. 4A
FIG. 5

SCRUBBER APPARATUS FOR WASHING GASES AND HAVING A COARSE AND FINE DROPLET SEPARATOR

CROSS REFERENCE TO RELATED APPLICATION

This application is a continuation-in-part of Ser. No. 847,671 filed Nov. 1, 1977, now abandoned which is a continuation of Ser. No. 557,130 filed Mar. 10, 1975 (now abandoned) as a continuation of Ser. No. 396,793 filed Sept. 13, 1973, also abandoned.

FIELD OF THE INVENTION

The present invention relates to an apparatus for washing gases and, more particularly, to a high-efficiency apparatus for the scrubbing of particulate-containing gases with a liquid, usually water, with improved means for removing the droplets from the gas.

BACKGROUND OF THE INVENTION

It is known to provide so-called packed towers for the washing of gases and, in general, tower-like apparatus for this purpose can use many of the mass-exchange principles known in the art.

In a packed (trickle) tower, the gas is passed upwardly through the interstices of a packing while the washing liquid is sprayed into the gas within the packing or thereabove, the gas undergoing many direction changes within the body of the packing material.

Such systems are characterized by a high pressure drop and are not always fully effective.

In other scrubbing systems, plate-type or impingement baffles are provided which cause deposition of the dust-entrapping liquid phase upon the surfaces which lie transversely to the gas stream intercept the latter. In some of these arrangements, a high efficiency of liquid recovery can be obtained while others are characterized by less efficient operation.

When gaseous components of the gas stream are to be solubilized or washed out, in addition to or apart from dust removal, still other systems may be provided to obtain maximum intimacy of contact between gas and the liquid phases.

With increasing attention to environmental pollution and particularly, greater efforts to remove dust from industrial gases before they are released into the atmosphere to eliminate toxic and nauseous gas components, and to release large volumes of relatively clean and uncontaminated gas into the atmosphere, considerable research has been undertaken to improve upon gas-washing and scrubbing systems of all types. It may be said, in this connection, that none of the prior art systems have been able to remove particulates and soluble gas components from a gas stream with low energy expenditure, small pressure drop, high efficiency and low apparatus costs heretofore.

More particularly, the conventional drip-type separators also known as wire mesh separators, may pass the gas through a stack of wire gauze, wire cloth or the like, this material constituting "packing" of a tower in the manner described. These systems have poor separating efficiency and are characterized by considerable pressure drop.

Of perhaps greater importance is the disadvantage that such systems must operate with a narrow range of operating parameters if even the limited efficiency of the system is to be maintained. Accordingly, significant deviations from the optimum operating parameter results in serious drops in efficiency and thus the systems have limited applicability. In such systems, as in all packed-tower systems, there is a tendency for solid deposits to form on the wire mesh and obscure the flow passages, thereby further increasing the pressure drop and requiring frequent and expensive maintenance.

Impingement or rebound towers have been used for recovering droplets of water entrained in a gas, particularly downstream of the cooling towers of power plants and other industrial installation. These systems have been found to be practical only where the gas enters the tower at a relatively high velocity. These systems are moreover, also characterized by the disadvantage that they operate only with a relatively narrow range of parameters before the efficiency falls off to a technologically unaccessible level.

OBJECTS OF THE INVENTION

It is, therefore, the principal object of the present invention to provide an improved gas-washing and droplet separating apparatus which avoids the disadvantages of earlier systems and performs high-efficiency separation of particulates and soluble gas components from a gas stream at relatively low apparatus cost and operating or energy expenditure.

Another object of this invention is to provide an apparatus for the purpose described which is capable of functioning over a wide range of operating parameters with high efficiency, these operating parameters including volume rate of flow of the gas, inlet velocity, degree of contamination, temperature of the incoming gas, etc.

Yet another object of this invention is to provide a high efficiency apparatus for the cleaning of gas which can be readily cleaned and which operates at a low pressure drop.

SUMMARY OF THE INVENTION

These objects and other which will become apparent hereinafter are attained, in accordance with the present invention, in a apparatus for the cleaning of gases which comprises a vertically elongated tower, e.g. formed by a cylindrical housing, to which the gas to be cleaned is fed in the bottom and from which cleaned gas, practically free from water droplets, is recovered at the top.

Above the gas inlet, the tower is provided with a filter bed and above this filter bed there is an array of downwardly directed wash-liquid jets for spraying the washing liquid, usually water, into the rising gas stream emerging from the filter bed and passing upwardly therethrough. To this extent, the filter bed functions as a trickle scrubber with the liquid and any entrained particulates and soluble components trickling downwardly through the bed in which the trickled liquid enters into mass exchange with the rising gas. The contaminated liquid can be collected at the bottom of the tower and recirculated as the washing liquid.

As the gases emerge from the filter, they contact the downwardly directed spray of liquid and are mechanically washed and scrubbed thereby.

Above the array of washing-liquid nozzles within the tower, there is provided a first or coarse droplet separator through which the gas passes with deflection from one side to another. A portion of the droplet entrained with the gas stream is thus intercepted by the baffle walls and permitted to drip downwardly, the liquid film on the baffle walls serving, additionally, to trap particulates which may be carried by the gas into contact therewith. Advantageously, a plurality of upwardly trained jets of washing liquid are provided below the first separator while a second group of downwardly trained jets of washing liquid is provided above this coarse separator. Spaced above the coarse separator, is a fine separator through which the gas stream is again deflected in opposite directions and which is formed by baffles having a closer spacing than the spacing of the fine separator, a further array of water jets being trained upwardly from beneath this second or fine separator.

The two separators are spaced apart from one another and from the filter bed. This spaced apart relationship of the impingement and direction-change or rebound separators from one another and from the filter have been found, surprisingly, to give efficient separation over a wide range of operating parameters as defined above and hence, in spite of the fact that earlier impingement separators and trickle scrubbers have been characterized by a narrow range of operating parameters for optimum results, the state of the present invention provides a wide range of variation.

While the reasons for the increase in the range of the operating parameters which can be used without decreased efficiency in the system of the present invention are not fully understood even to this day, it appears that the spaced-apart relationship described above is essential to the phenomenon as is the relationship of coarse and fine separators as mentioned previously. There are some ideas on the subject and these will be elucidated below.

It appears to be important that the distance between the coarse and fine separators is sufficient that any re-entrained but previously separated out droplets and particles from the coarse separator do not reach the fine separator. Further the phenomenon of deposit formations which tends to be somewhat pronounced on the lower separator is precluded by the aforedescribed arrangement of the nozzles, thereby ensuring that deposit-forming materials are washed away by the periodic or continuous introduction of the washing liquid.

According to a feature of the invention, the lower or coarse droplet separator comprises at least one row of spaced apart mutually parallel plates inclined in one direction to the vertical and separated by a spacing A and a corresponding second row terminating substantially in the plane of the upper edges of the first row and inclined in the opposite direction of correspondingly spaced mutually parallel plates of the same length as the plates of the first row, the plates of the second row being laterally offset so that their lower edges lie substantially midway between the upper edges of the plates of the lower row. The gas stream is thus deflected first in one direction and then in the other direction and the flow between a pair of lower plates being split by a plate of the upper row which deflects it in the opposite direction.

Each pair of plates thus defines a flow passage and a plurality of such rows of plates are separated by respective vertical partitions. Each pair of partitions is spaced apart in a direction transverse to the rows of the aforementioned plates defining a respective flow chamber which is subdivided by the oppositely inclined plates into the respective flow passage mentioned previously. According to the invention, moreover, the oppositely inclined plates of the first or coarse separator are formed with grooves in a chevron configuration, the groove converging upwardly and having their axes lying in the vertical plane of symmetry which extends in the flow direction of each chamber.

According to another feature of the invention, the fine separator is likewise formed with a plurality of mutually parallel transversely spaced vertical partitions defining respective flow chambers between them and preferably extending parallel to the partitions of the first or coarse separator.

Spanning these partitions of the fine separator, is an array of baffle plates which can also be generally of trapezoidal shape with oppositely inclined surfaces meeting in a surface parallel to the axis of the tower, the upper and lower edges of each of these baffle plates likewise lying in planes parallel to the axis of the tower.

According to the invention, the spacing of these baffle plates is approximately half the spacing of the plates of each row of the coarse separator, e.g. about A/2.

Furthermore, at least the inclined portion of the baffle plates of this fine separator are formed with grooves in a chevron pattern, the axis of the chevron grooves of each baffle plate lying in the vertical median plane of the respective separating chamber.

According to yet another feature of the invention, the latter grooves are formed as corrugations in the baffle plates of the fine separator and terminate inwardly of the partitions thereof whereby smooth surfaces are provided in the vertical direction flanking each array of chevron-shaped grooves or corrugations and adjacent each pair of partitions of the fine separator to facilitate liquid runoff.

Finally, the coarse and fine separators are spaced apart and constructed and arranged that the flow velocity in the fine separator is approximately 1.5 times greater than that in the coarse separator.

The inclination of the plates of the coarse separator to the vertical should be approximately 30° while the inclination of the inclined walls of the baffle plates of the fine separator should be approximately 45° to the vertical.

It has been found that the wide range of operating parameters is particularly pronounced because of the pseudoherringbone structure of the lower or coarse separator plates while the upper baffle plates have a configuration corresponding substantially to a trapezoidal shape in vertical section, the depths of the grooves formed in the plates should be such as to accommodate the droplets which collect on the plates and prevent re-entrainment. This depth should be at least equal to the thickness of the plates.

In order to explain the unusual wide band of operating parameters which can be used without loss of efficiency of the apparatus, Applicants have investigated the construction described above in some detail.

It appears that the improved results derive from the fact that the flow of gas is subdivided into streamlets by the vertical partitions and the inclined plates of the lower or coarse separator, each streamlet being deflected first in one direction and then in the opposite direction while being split approximately in half in passing from one inclined direction of flow to the other between the flow passages of the plates of the coarse separator. This superimposes on the twist motion of each streamlet caused by the opposite direction of deflection, a turbulence within the streamlet which is especially pronounced at the region of deflection from one direction to the opposite direction. The resulting turbulence spectrum is characteristic of the splitting of the streamlet upon its passage from the first or lower row of plates between the second or upper row of plates of the coarse separator.

These split streams result in turbulent vortexes rotating in opposite sense which are intercepted as the streamlets pass between the plates of the fine particle separator and will accelerate therethrough by the smaller flow cross-sections afforded thereby. Between the upper and lower separator, the turbulent action and the need to redistribute itself causes the gas stream to undergo an arcuate deflection in the opposite sense from that which the gas assumed in traversing the coarse separator. With the passages formed by the trapezoidal baffle plates of the fine separator, the gas stream undergoes a tighter deflection again in the opposite direction with increased turbulence superimposed upon the arcuate motion of the gas.

It is the combination turbulence the turbulance and multiarcuate deflections of the gas streams in opposite directions which appears to bring about the increase in the range of parameters under which the system can be operated with high efficiency.

Advantageously the rows of blades or vanes of the coarse particle separator are inclined to the horizontal, preferably in a chevron pattern.

BRIEF DESCRIPTION OF THE DRAWING

The above and other objects, features and advantages of the present invention will become more readily apparent from the following description, reference being made to the accompanying drawing in which:

FIG. 3 is a detail view of region III of FIG. 1;

FIG. 4 is a view of the detail of FIG. 3 taken in the direction of arrow 4 thereof;

FIGS. 4A and 4B are views illustrating in greater detail the groove configuration of the plates of the coarse separator;

FIG. 5 is a view of the detail of FIG. 3 taken in the direction of arrow V thereof;

SPECIFIC DESCRIPTION

Figure 1:
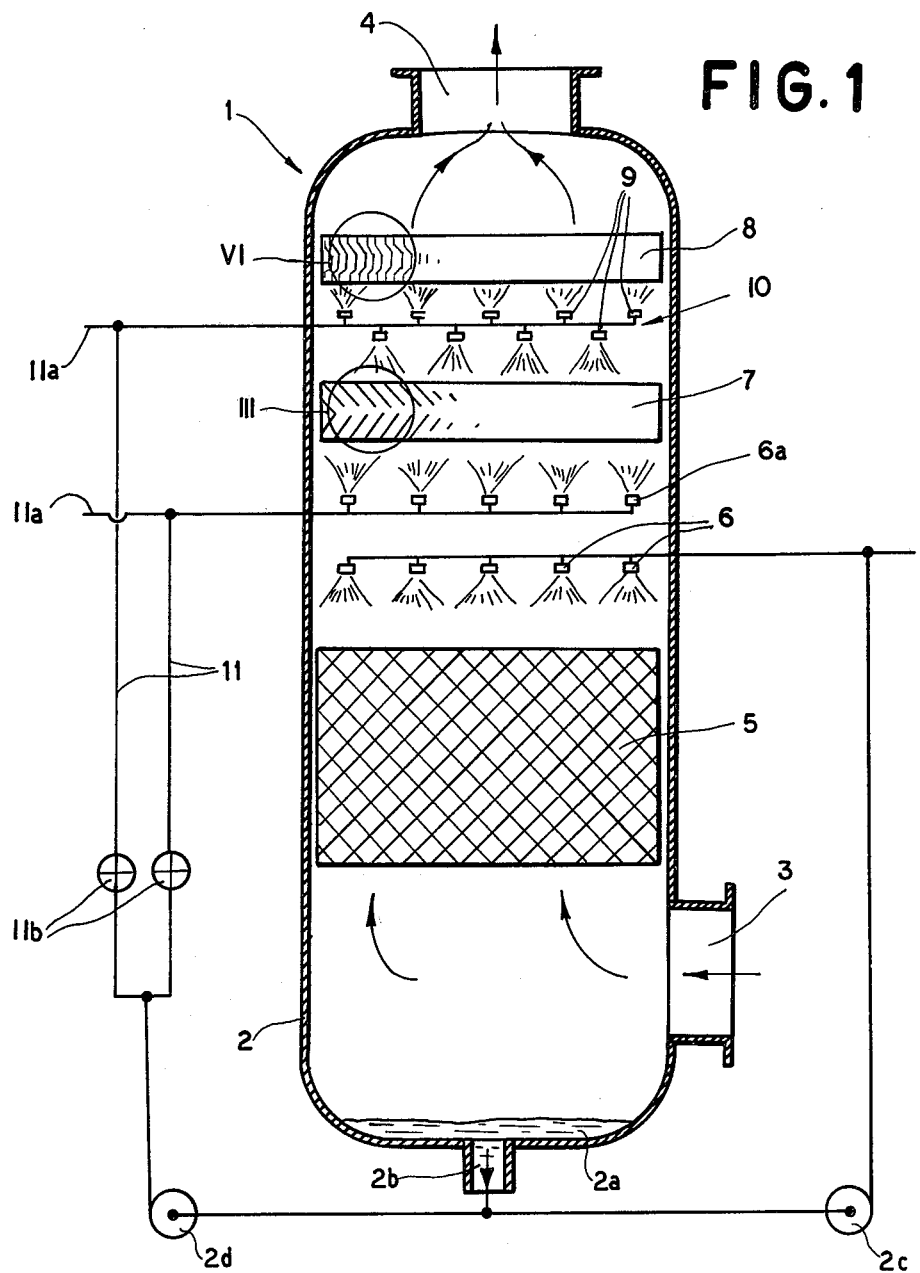
FIG. 1 is a diagrammatic vertical section through a washing tower according to the invention.

In FIG. 1 I have shown a tower for washing of gases, the apparatus 1 comprising a cylindrical housing 2 having an inlet 3 for the waste gas. Above the inlet 3 there is provided a filter or packed bed 5 of any desired trickle washer construction above which is located an array of nozzles 6 for spraying the washing liquid downwardly. The washing liquid can be recirculated from the sump 2a via an outlet 2b and a pump 2c.

The gas stream passes upwardly to a coarse particle separator 7 which includes a further array of nozzle 6a directing jets of water upwardly while nozzles 6 can direct jets of water downwardly. Spaced above this coarse separator is a fine separator 8 along the bottom of which further nozzles 9 of the washing-liquid spray system 10 direct jets of water upwardly and downwardly. The gas is discharged through an outlet 4 and the pipes for recirculating water via the pump 2d or fresh water inlets 11a have been represented at 11 and are provided with control valves 11b.

Figure 2:
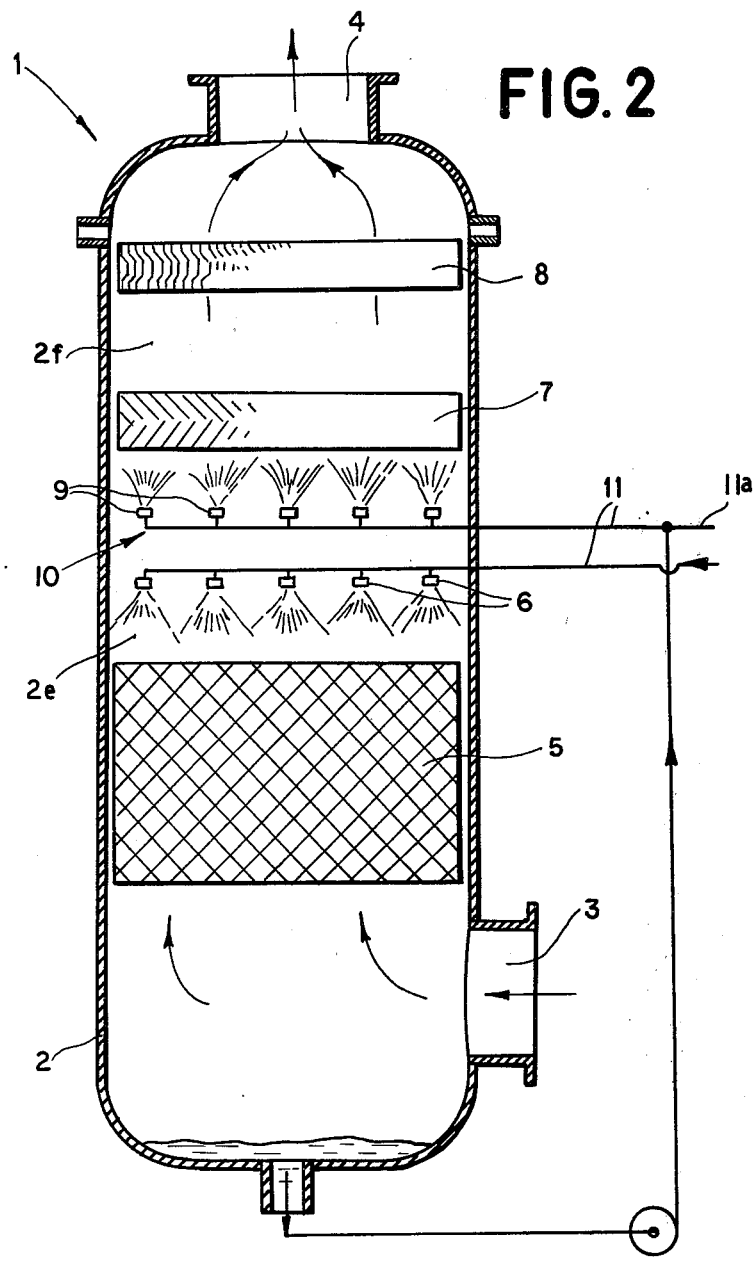
FIG. 2 is a section similar to FIG. 1 illustrating a modification of the system thereof.

In the modification of FIG. 2, the same numerals are used to represent similar structure but here only downwardly directed jets 6 and upwardly directed jets 9 are provided in the space 2e between the filter 5 and the coarse separator 7. The space 2f between the separator 7 and 8 is free from spray means.

The coarse-particle separator comprises a plurality of vertical spaced-apart partitions 16 which are held in transverse channels 23 spanning the column and lying parallel to the axis of the tower and to the plane of the paper in FIGS. 1 and 3. The partitions 16 define flow chambers C between them. Each of the flow chambers C is provided, in addition, with a lower row $R_1$ of inclined plates 12 here shown to be inclined to the vertical by an angle $\alpha$ of 30°, these plates terminating in a plane P which can be coincident with or spaced slightly from the plane P' in which the plates 21 of the upper row $R_2$ terminate at their lower ends. The plates 12 have a spacing A and the plates of the upper row are offset from the plates of the lower row so that a lower edge 12' of each upper plate 12 lies between the upper edges 12" of the plates of the lower row. The plates thus defined flow passages B between them. Each plate 12 is formed with upwardly converging grooves 14 in a chevron pattern, the grooves terminating inwardly of the partitions 16 by distances 24 provide smooth run-off areas.

The upper or fine separator 8 is provided with flow chambers C' and flow passages respectively. The chambers are defined between vertical partitions 16' held in channels 23' analogous to the partitions and channels previously described. The flow cross-sections 15 of the lower separator are here analogous to flow channels 15' which are defined between plates 13 of trapezoidal configuration. Each trapezoidal plate 13 comprises an inlet portion 13a which lies in a vertical plane, an inclined portion 13b forming an angle $\beta$ of about 45° with the vertical, a further section 13c parallel to the vertical, an oppositely inclined section 13d and an outlet portion 13e also parallel to the vertical. Chevron grooves 14' are provided in each plate with the axis of the chevrons lying in the vertical median plane P" of the respective chamber.

The grooves 14', defined by the crests and troughs 19 and 20, respectively, terminate inwardly by a distance 24' of the partitions 16' so that smooth run-off zones are provided in these regions.

Figure 9:
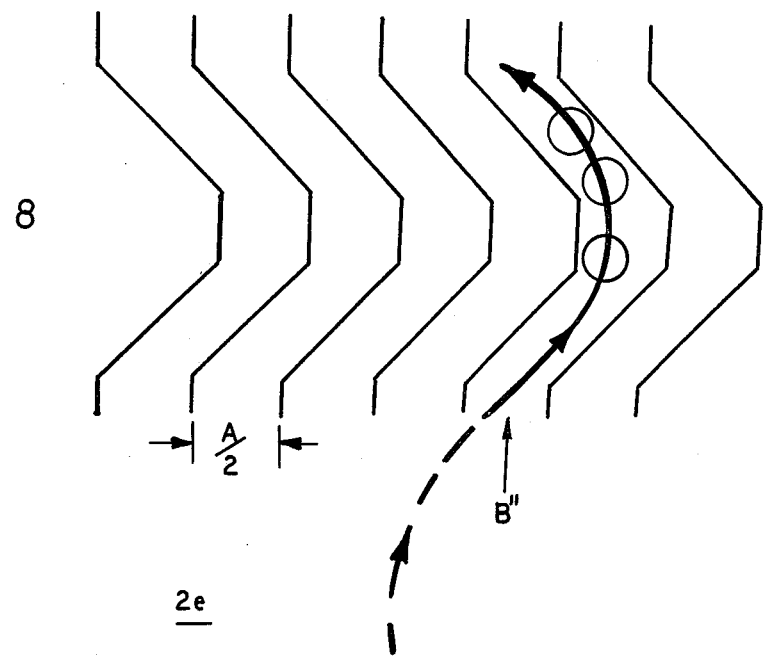
FIG. 9 is a diagram useful in understanding the principles of the invention.

While the trickle scrubber 5 operates in the manner previously described, the separator operation is reflected in FIG. 9. The droplet entraining gas stream entering the lower separator 7 in the direction of arrow 21 is deflected in the counterclockwise sense in the flow passages B and a turbulence is superimposed thereon as the flow is split at S where the streamlets pass into the passages B'. The streamlets are induced to deflect in the clockwise sense in the space between the separators, represented at 2e, and enter the flow passages B'' which have the reduced width A/2 where they are diverted tightly again in the counterclockwise sense. The increased velocity and tighter deflection superimposes turbulence upon the stream as indicated.

The gas emerging at 4 is practically free from droplets and any particulates which may have originally been present.

Figure 10:
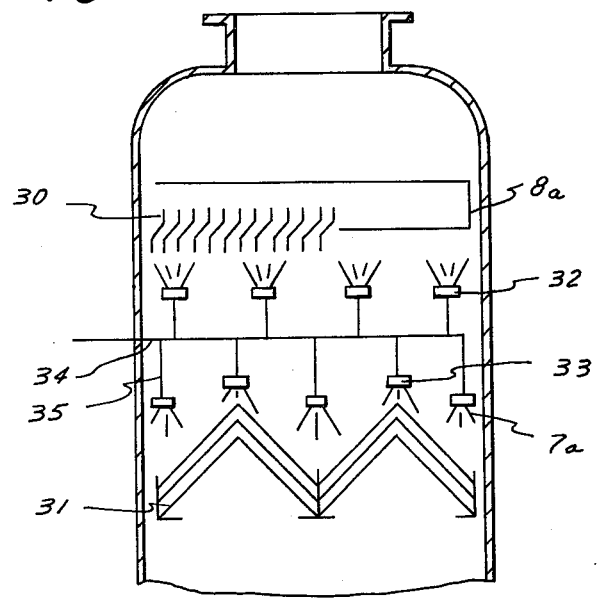
FIG. 10 is a vertical cross-sectional view through an embodiment of the invention having alternative constructions of the coarse and fine particle separators.

FIG. 10 illustrates a modification of the tower of FIG. 1 according to a feature of the invention wherein, instead of plates 13 of the fine particle separator 8, the fine particle separator 8a is provided with plates 30 which have the configuration of half trapezoids, i.e. deflect the fluid to the right and then out of the fine particle separator.

Figure 13:
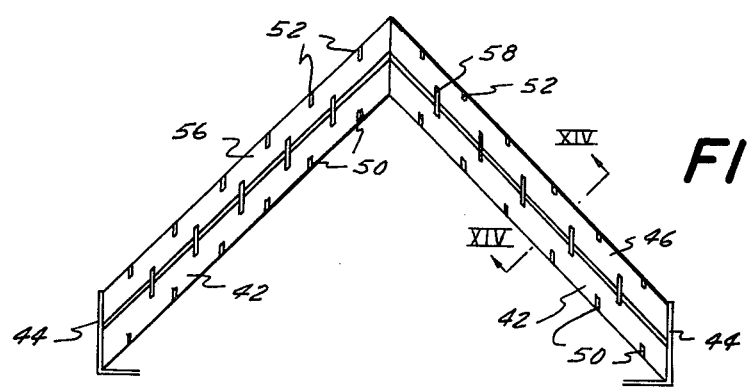
FIG. 13 is an end view of this coarse particle separator.

In addition, the coarse particle separator can have plates 31 whose orientation is of the type shown in FIG. 9 (see FIG. 14) but can have a chevron outline as can be seen from FIG. 10 and 13. The tower of FIG. 10 thus comprises two units of the type shown in FIG. 13 in side-by-side relationship.

The spray nozzles 32 and 33 are mounted on a water line 34 and can have connecting fitting 35 of a length dimensioned to compensate for the greater distance of portions of the coarse particle separator 7a from the supply pipe 34. The chevron-shaped coarse particle separator has been found to be more efficient in the combination previously discussed with a fine particle separator and a packing mass 5 (see FIG. 1).

Figure 11:
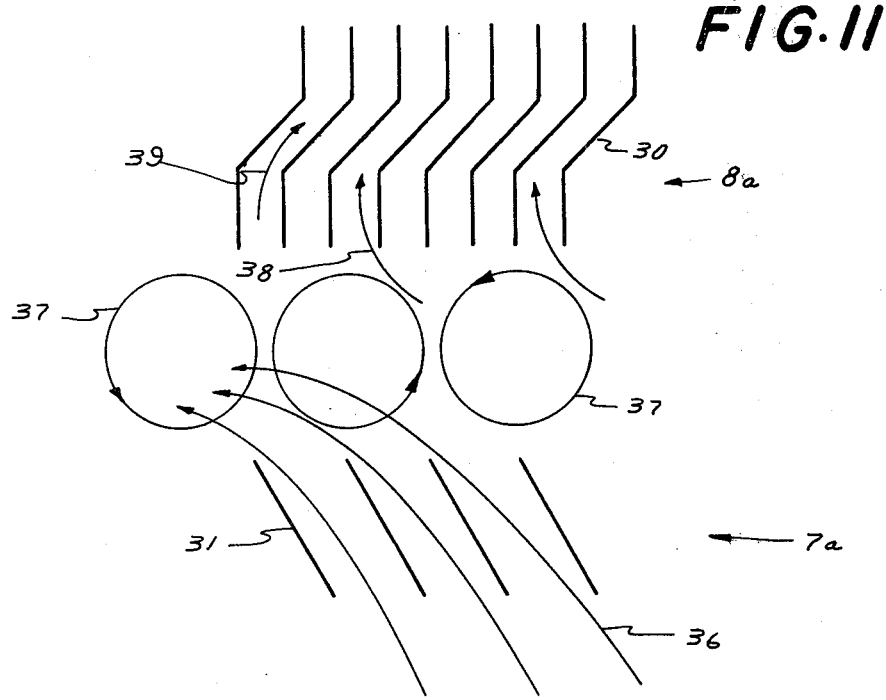
FIG. 11 is a diagram similar to FIG. 9 illustrating operation of the system of the present invention.

FIG. 11 shows a characteristic of the operation of the system of FIG. 10. The gas last deflected to the left by the upper row of plates 31 (as shown at 36) encounters an oppositely rotating system (arrows 37) of gas which is then caused to pass between the plates 30 of the fine particle separator as represented by arrows 38. Within the passages between plates 30, the gas is deflected in the opposite direction, i.e. to the right.

Figures 6, 7:
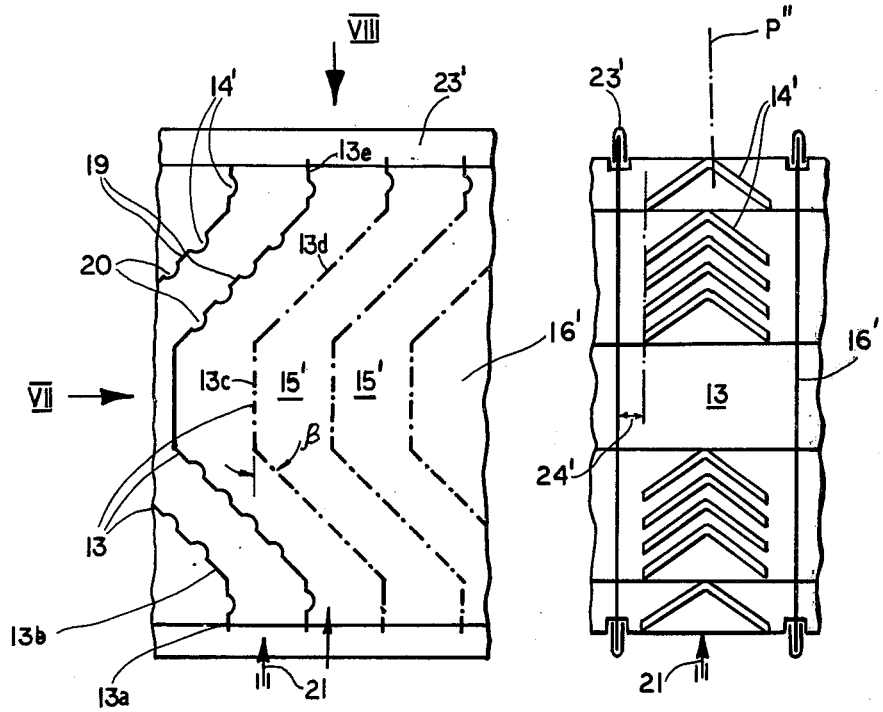
FIG. 6 is a view drawn to an enlarged scale illustrating the region VI of FIG. 1, i.e. a detail of the construction of the fine particle separator.
FIG. 7 is a view of the detail of FIG. 6 taken in the direction of the arrow VII thereof.
Figure 8:
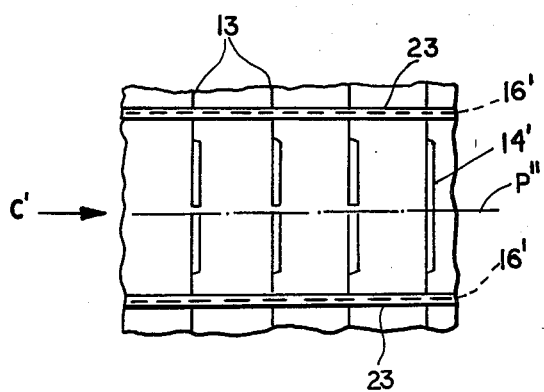
FIG. 8 is a view of the detail of FIG. 6 taken in the direction of the arrow VIII thereof.

Thus, the sense of the swirl of the gas brought about by the orientations of the plate 31 (arrows 36) is opposite to the swirl represented at 37 in the space between the coarse and fine particle 7a and 8a respectively. Within the fine particle separator, whether of the whole-plate type shown in FIGS. 6 and 7 or the half plate type shown in FIGS. 10 and 11, the deflection of the gas stream is opposite to the swirl 37.

The inclined flanks of the coarse particle separator (FIGS. 10 and 13) have been found to further increase the separation efficiency.

Figure 12:
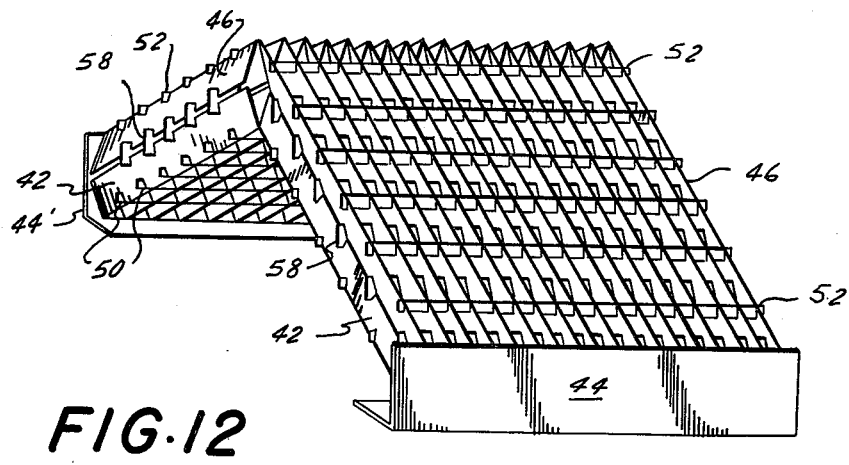
FIG. 12 is a perspective view of a portion of the coarse particle separator of FIG. 10.
Figure 14:
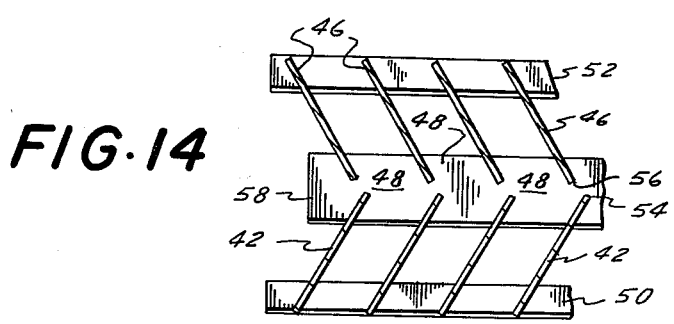
FIG. 14 is a cross-sectional view taken along the line XIV—XIV of FIG. 13.

FIGS. 12 through 14 show an impact-type mist eliminator which can be used in the combination of the present invention with particularly high effectiveness, and, especially, current separation efficiency than the horizontal coarse separator shown in FIG. 1.

The unit of FIGS. 12 through 14 includes a first series of spaced blades or vanes 42 whose lower ends are connected to end plates 44 and 44' for the right and left hand blades 42. The blades are pitched at an angle of about 20° to 30° to the direction of air flow. A second series of spaced blades 46 and having lower ends secured to plates 44 and 44' is also provided. The blades 46 are inclined with respect to the direction of air flow with the same angle as the inclination of blades 42 but are pitched in the opposite direction and are disposed so as to define with the first series of blades 42 and plurality of zigzag paths 48 for the gas stream.

The height of the blades 42 and 48 with respect to the spacing between the series of blades is such that the inner edges are not in contact with one another. Stiffened webs or ribs 50, which are secured along the upstream edges of blades 42, and a second series of stiffening webs or ribs 52 mounted along the downstream edges of blades 46 provide additional support for these blades.

The trailing edges 54 of blades 42 and the leading edges 56 of blades 46 are connected at spaced intervals by stiffening webs or ribs 58. These stiffening ribs allow the blades to be made from light gauge material. The units are mounted so that the longitudinal axis of the blades on each assembly, consisting of two series of blades and stiffeners, is at an angle of 30° to 45° to the direction of gas flow.

This arrangement can, of course, be substituted for the mist eliminators and coarse particle separators of FIG. 2 as well.

We claim:

1. A washing apparatus for removing particulates or soluble components from a gas stream, comprising:
    an upwardly elongated tower formed with an inlet at the bottom portion thereof for admitting gas to said tower and an outlet at a top portion thereof for discharging clean gas;
    filling means in said tower above said inlet and traversed by gas rising from said inlet;
    spray means in said tower above said filling means for washing the gas rising within said filling means;
    a coarse separator spaced above said filling means and between said spray means and said outlet for removing droplets from the gas emerging from said filling means, said coarse separator comprising a plurality of mutually parallel horizontally spaced vertical partitions defining respective flow chambers between them, each of said flow chambers being provided with a lower row of mutually parallel spaced-apart inclined plates spanned between the partitions defining the respective chamber, and an upper row of correspondingly spaced oppositely inclined plates spanned between the partitions of the respective chamber, the lower edge of each plate of the upper row lying between upper edges of plates of the lower row; and
    a fine separator spaced above said coarse separator in said tower between said spray means and said outlet, said fine separator comprising a plurality of horizontally spaced mutually parallel vertical partitions defining respective flow chambers between them, and a row of geometrically similar baffle plates spanned between the partitions of each of the chambers of said fine separator, said baffle plates each having a pair of oppositely inclined portions and being spaced apart by a distance of approximately half the spacing between the plates of each row of said coarse separator, each of said baffle plates being formed with an array of chevron-shaped corrugations converging upwardly and having the vertices lying in the vertical median plane of the respective chamber of said fine separator, said corrugations of each baffle plate terminating inwardly of the partitions of the respective chamber of said fine separator to form adjacent the latter partitions respective run-off zones of each baffle plate, said separators being constructed and arranged such that the flow velocity of the gas in said fine separator is substantially 1.5 times the velocity of the gas in said coarse separator.

2. The washing apparatus defined in claim 1 wherein said plates of said coarse separator are inclined at approximately 30° to the vertical.

3. The washing apparatus defined in claim 1 wherein the inclined portions of said baffle plates are inclined at approximately 45° to the vertical.

4. A washing apparatus for removing particulates or soluble components from a gas stream, comprising in combination:
   an upwardly elongated tower formed with an inlet at the bottom portion thereof for admitting gas to said tower and an outlet at a top portion thereof for discharging clean gas;
   a packing in said tower above said inlet and traversed by gas rising from said inlet;
   spray means in said tower above said packing for washing the gas rising within said packing;
   a coarse separator spaced above said packing and between said spray means and said outlet for removing droplets from the gas emerging from said packing, said coarse separator comprising a lower row of mutually parallel spaced-apart inclined plates and an upper row of correspondingly spaced oppositely inclined plates, the lower edge of each plate of the upper row lying between upper edges of plates of the lower row whereby the plates of said coarse separator impart a swirl in one sense to the gas traversing same;
   a fine separator spaced above said coarse separator in said tower between said spray means and said outlet, said fine separator comprising a row of geometrically similar baffle plates, said baffle plates each having a portion inclined opposite the inclination of the plates of said upper row and being spaced apart by a distance less than the spacing between the plates of each row of said coarse separator, each of said baffle plates being further formed with upward and downward vertical extensions whereby a swirl is imparted to the gas passing between the baffle plates in the opposite sense, said separators being constructed and arranged such that the flow velocity of the gas in said fine separator is substantially greater than the velocity of the gas in said coarse separator and sufficient to impart turbulence to the gas in said fine separator; and
   further spray means between said separators for spraying a liquid into the gas.

5. The washing apparatus defined in claim 4 wherein said plates of said coarse separator are inclined at approximately 30° to the vertical, and the inclined portions of said baffle plates are inclined at approximately 45° to the vertical.

6. The apparatus defined in claim 4 wherein said rows of plates of said coarse separator are upwardly and inwardly inclined to form a chevron-shaped structure.

7. The apparatus defined in claim 4 wherein said rows of plates of said coarse separator extend horizontally.

8. The apparatus defined in claim 4 wherein said baffle plates have further inclined portions extending upwardly from the upper extensions.

9. The apparatus defined in claim 8 wherein said further inclined portions are inclined oppositely to the first-mentioned inclined portions.

10. The apparatus defined in claim 4 wherein said further spray means has upwardly and downwardly directed nozzles.